United States Patent [19]

Klimczak

[11] Patent Number: 4,632,680
[45] Date of Patent: Dec. 30, 1986

[54] PLANAR SIDED AIR SHAPING INSERTS FOR FILTER BAGS

[75] Inventor: William J. Klimczak, Anoka, Minn.

[73] Assignee: Carter-Day Co., Minneapolis, Minn.

[21] Appl. No.: 792,265

[22] Filed: Oct. 28, 1985

[51] Int. Cl.⁴ ............................................. B01D 46/04
[52] U.S. Cl. .................... 55/302; 55/341 R; 55/379
[58] Field of Search .............. 55/302, 341 R, 378, 55/379

[56] References Cited

U.S. PATENT DOCUMENTS

| | | |
|---|---|---|
| 3,499,268 | 3/1970 | Pausch . |
| 3,509,698 | 5/1967 | Medcalf . |
| 3,594,992 | 7/1971 | Carr . |
| 3,606,736 | 6/1969 | Leliaert . |
| 3,685,257 | 8/1972 | Burke . |
| 3,729,903 | 5/1973 | Espeel et al. ............. 55/302 X |
| 3,798,878 | 3/1974 | Pausch . |
| 3,816,978 | 6/1974 | O'Dell . |
| 3,891,418 | 6/1975 | Burger . |
| 3,999,968 | 12/1976 | Brookman . |
| 4,033,732 | 7/1977 | Axelsson . |
| 4,046,526 | 9/1977 | Phillippi . |
| 4,231,770 | 11/1980 | Johnson, Jr. . |
| 4,251,244 | 2/1981 | Evenstad . |
| 4,272,263 | 6/1981 | Hancock . |
| 4,278,454 | 7/1981 | Nemesi . |
| 4,336,035 | 6/1982 | Evenstat et al. .......... 55/379 X |
| 4,401,446 | 8/1983 | Johnson, Jr. . |
| 4,504,288 | 3/1985 | Kreft ........................ 55/302 |
| 4,504,293 | 3/1985 | Gillingham . |

Primary Examiner—Charles Hart

[57] ABSTRACT

Air shaping mouth inserts for bag type air filters formed as planar sided tubes of rectangular and triangular cross section are inserted into the open ends of the bags. Their mouths are sealed to the bag rim so that air flow is restricted to the interior of the tube insert. This type of insert facilitates shaping and distribution of the reverse jet cleaning pulse by rotating the tubes around the axis or by altering the straight sides to unbalance the cross section of the air flow path.

6 Claims, 3 Drawing Figures

PLANAR SIDED AIR SHAPING INSERTS FOR FILTER BAGS

SUMMARY OF THE INVENTION

This invention deals generally with gas separation and more specifically with air cleaning by means of a filter media which uses reverse flushing.

Multiple bag or sleeve filter assemblies are quite common in industrial installations. Typically, such filters are constructed of multiple bags or closed sleeves hanging vertically from an air sealed plate, called a tube sheet, which separates clean air from dirty air. Usually, the space below the plate includes an entry for the dirty air, and clean air exits above the plate. The long cylindrical bags hang down into the dirty air chamber, and the air moves through the bag walls, into the volume enclosed by the bag, and out the bag mouth at the top of the bag which is open to the clean air chamber above the bag attachment plate. Dust and other solid contaminates are separated from the air as it passes through the bag wall, and the dust is trapped on the outside of the bag and clings to it.

In order to clean the filter bags, the dust is knocked loose from the outside of the bags, so that it falls to the bottom of the dirty air chamber from which it is removed mechanically. This cleaning operation uses reverse air flow into the mouth of the bag to move the air back through the bags, so that the dust will be knocked off the outside of the bag. The most common method of generating the reverse air flow is by the use of a sharp pulse of compressed air which induces a flow back through the bag, that is, into the bag's open mouth. This system has the advantage of being operable even while the normal dust laden air is still flowing through adjacent bags. The pulsed reverse air system functions because the normal air flow is produced by fans or blowers which furnish high volume and relatively low pressure air, while the pulsed reverse air is of considerably higher pressure and of relatively low volume. The higher pressure reverse air flow, therefore, overcomes the normal low pressure air and enters the bag mouth. The reverse air is generally sequentially activated on a limited number of bags and it operates cyclically to eventually affect all the bags.

The basic premise upon which the pulsed reverse air system operates is that the pulse of air travels down through the bag, from the open mouth top to the closed end, and dislodges the dust. The dust is propelled perpendicularly away from the bag surface and the dislodged dust is agglomerated into larger particles and drops into the bottom of the collector as the carrying velocity is many times higher than the velocity near the bag.

The directing and shaping of the reverse air pulse which does the bag cleaning has been a favored subject for development and patent activity in these type of filter systems. Numerous venturi throats for insertion into the bag mouths and air shaping jets at the compressed air source, have been developed, used and patented. But all these devices have one characteristic in common. They are essentially symetrical about a center axis. To be more specific, they are all "figures of revolution". Most, in fact, are essentially circular in nature. Moreover, they are all fixed in construction, so that no adjustment is possible other than some limited axial movement.

Efficient operation of the equipment is therefore dependent upon the air flow and dust trapping conditions being exactly those which were predicted as criteria at the time of the original design of the equipment. Such a situation is quite suitable for text book problems, but anyone who has ever attempted to operate complex equipment in the field knows very well that machines rarely operate exactly as they are supposed to. This is particularly true of devices which operate with ambient air since, being a compressible fluid, it changes its characteristics constantly. Thus, the altitude of the location of the equipment, the ambient temperature, the humidity, and the nature of contaminate being carried by the air all vary the interaction between the reverse pulse of air, the shaping device in the bag mouth, the forward flow of dust laden air, and the bag. Even the bag itself will change its characteristics not only with such factors as temperature and humidity, but even with the amount of dust it has trapped.

And yet with all these unpredictable variables, only fixed air shapers are used in the bag mouths, resulting in a far from optimum cleaning action in most equipment. It may be more accurate to say that when optimum cleaning action results it is "pure dumb luck".

The present invention changes that. It furnishes a bag mouth insert which is easily field adjustable, and can therefore be adjusted for optimum performance in any unusual field situation. Of course, the inserts would typically be set at the factory or during installation for the predicted conditions of operation, but unlike all existing inserts, the inserts of the present invention can also be easily field adjusted if conditions are not as expected.

The inserts of the present invention are essentially constructed as planar sided tunnels whose axes parallel the sides of the bags. Thus, each bag is blocked at its open top except for the tunnel entrance which is formed in the shape of a multi-sided figure such as a triangle, rectangle or polygon. This tunnel cross section at the bag opening is extended into the bag for some length so that a straight-sided tunnel of essentially the same cross section as the mouth opening extends somewhat into the bag. This insert provides several advantages over the traditional inserts which are formed from figures of revolution.

Most important, the present prism-like tunnel insert furnishes an ability to adjust the reverse air distribution at the mouth of each bag, but an additional benefit is that these new inserts can be manufactured much more easily and economically than the traditional bag insert.

Instead of the casting and machining required to produce circular section inserts, this new insert can be produced by simple and inexpensive sheet assembly techniques.

Adjustment of the air flow through the planar sided air shaping inserts is also accomplished very easily. The simplest adjustment is that of merely rotating the tunnel-like insert on its axis. This can be done because the bag mouth opening is itself circular and the disc-like fixture which blocks off the mouth, and from which the straight sided insert is suspended, is circular. Thus, mere rotation of this circular disc rotates the insert on its axis and realigns the corners of the insert body, the joints between the straight sides, relative to the bag. This is sometimes of value because of discontinuities, such as seams, in the bag or because forward air flow, the flow of the dirt-laden air, may in some instances cause uneven distribution of dirt upon one or more bags due to the layout of the group of bags or the particular nature of the contaminate. Clearly, a mere rotation of the insert supporting, bag mouth disc is an easy field adjustment.

Another adjustment possible with planar sided inserts is that of changing the actual cross section of the insert. Again, with straight sided inserts this type of adjustment is very simple. To reduce the cross section of a rectangular cross section insert, for instance, one need only fill part of the insert with a rectangular slab, which can be produced from virtually any material, and bonded to the side of the insert.

Another way of reducing the cross section of the insert is to actually move one of the straight sides closer to the axis. One way this is easily accomplished is if the insert is originally constructed with at least one side which includes overlapping corners which are captured between two other parallel sides and held with, for instance, sheet metal screws.

The potential of field adjustment of the orientation or cross section of the planar sided insert furnishes a new and very versatile improvement to bag type filters, but it also reduces the cost of original construction and installation of such filters as opposed to cast orifices.

DETAILED DESCRIPTION OF THE INVENTION

Figures 1, 2:
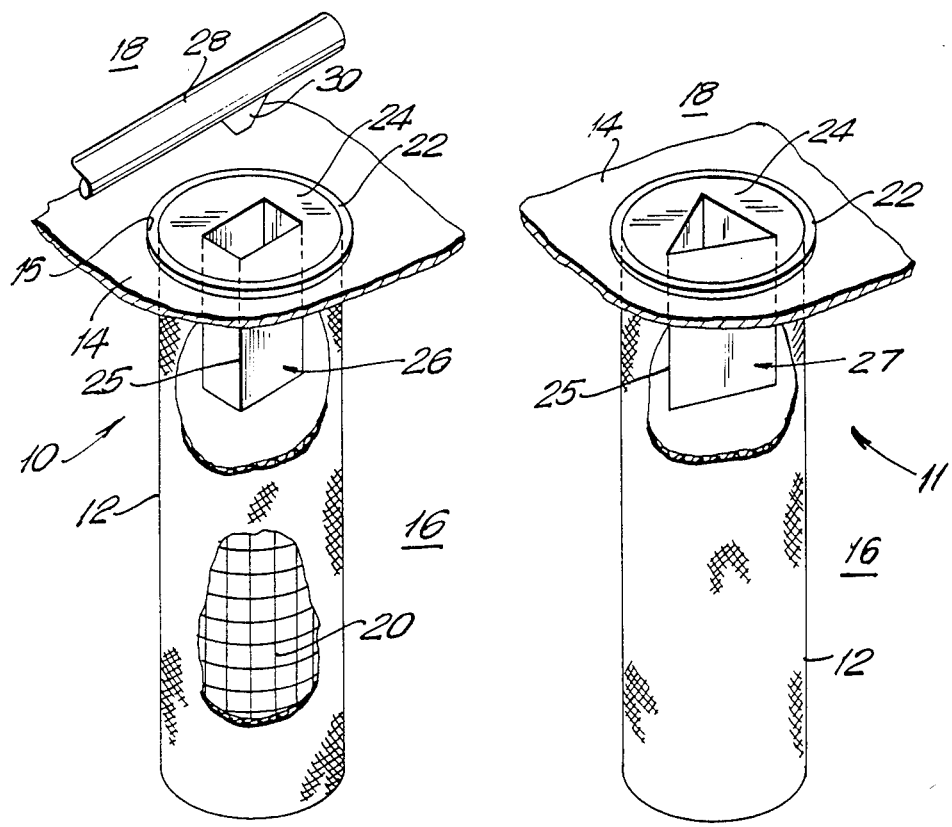
FIG. 1 is a perspective view of a bag filter assembly of the preferred embodiment of the invention with a rectangular cross section planar sided insert.
FIG. 2 shows an alternate embodiment of the insert of the present invention with a triangular cross section.

FIG. 1 shows bag filter assembly 10 of the preferred embodiment of the invention with bag 12 extending from tube sheet 14. Region 16 below tube sheet 14 is the volume into which the dust laden air is introduced, and after the air passes through the fabric material of bag 12 upon which the dust is deposited, the air passes into clean air region 18 from which is removed. Fans or blowers, not shown, furnish the air movement, and wire or perforated metal frame 20 is used to support bag 12 and keep it from collapsing in upon itself due to its resistance to flow from dusty air region 16 into the interior of bag 12.

Bag 12 is held onto tube sheet 14 and around hole 15 by sealing ring 22 which is constructed to restrict air flow through tube sheet 14 to air which passes through the mouth of bag 12. Sealing ring 22 is also the means for connecting insert disc 24 within the opening in tube sheet 14 to which bag 12 is connected. Insert disc 24 and sealing ring 22 are constructed as circular concentric pieces so that insert disc 24 may be rotated within sealing ring 22.

Insert disc 24 supports insert body 26 which extends into bag 12 for up to twenty percent of the axial length of bag 12. Insert body 26 is constructed from planar surfaces which intersect each other at corners 25 to form the straight sided, tunnel-like configuration of insert body 26. In FIG. 1 insert body 26 has the cross section of a rectangle.

FIG. 2 shows an alternate embodiment 11 of the invention in which insert body 27 is of triangular cross section. Other parts of the assembly are the same as FIG. 1.

Induction pipe 28 is the source for delivery of the reverse jet of air which enters insert body 26 (or 27) at tube sheet 14 and moves axially through the insert body to clean bag 12 and push the dirt off of its exterior surface.

As can be appreciated from the figures, it is a simple matter to rotate either insert body 26 or 27 within sealing ring 22 to change the orientation of corners 25 relative to any particular point on bag 12.

Figure 3:
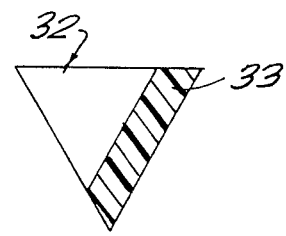
FIG. 3 shows several alternate embodiments of insert cross sections, and means for field adjustment of their cross sectional configuration.
Figure 3:
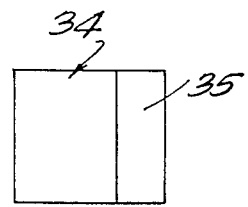
Figure 3:
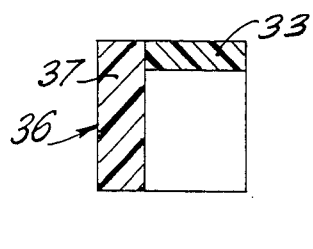
Figure 3:
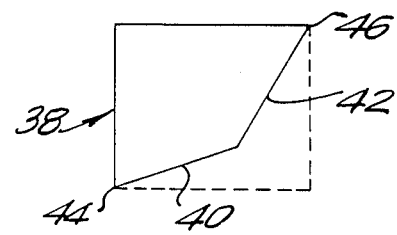

FIG. 3 depicts several variations of cross sections of inserts. Insert 32 has a triangular cross section; inserts 34, 36 and 38 are shown as rectangular cross section. Several methods of field adjustment of inserts are also shown in FIG. 3.

Insert 32, with triangular cross section, and insert 36 of rectangular cross section permit a very simple field adjustment. Their cross sections can be easily modified by the insertion of fillers 33 and 37, which may be formed from various materials such as plastic, foam or metal, and bonded into the insert body to reduce the cross section.

Insert 34, of rectangular cross section can also be field modified by bending sheet metal side 35 so that part of side 35 is in the cross section plane at the bag mouth and its length has the shape of an inverted "L". Such a bend actually shortens side 35 at the far axial end, but such a change has little effect on the air flow.

Insert 38, also rectangular in cross section, shows another field modification method. It involves bending sides 40 and 42 inward at their junctions 44 and 46 with the adjacent sides to form a four sided planar tunnel with no parallel sides.

The embodiments shown have the particular advantage over prior art inserts that they afford virtually unlimited variations in flow patterns and very easy field adjustment of those patterns.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example multisided cross sections such as hexagons may also be used for inserts.

What is claimed as new and for which Letters Patent of the United States is desired, is:

1. An air shaping insert for filter bag mouths of a multiple bag filter assembly in which the filter bags extend from a tube sheet which separates a dirty air region from a filtered air region and in which the bag mouths open into the filtered air region, the insert comprising:

a sealing means which holds the filter bag onto the tube sheet so that the filter bag seals around a hole in the tube sheet and restricts air flow through the tube sheet to air which passes through the bag mouth;

an insert disc concentric with the sealing means and slideably attached to it so that the insert disc may be rotated relative to the sealing means, the insert disc including an opening;

an insert body attached at the opening of the insert disc, determining the configuration of the opening and extending into the filter bag, the insert body being formed of planar sides extending transverse to the tube sheet, and the insert body having straight-sided cross sections.

2. The air shaping insert of claim 1 wherein the cross sections of the insert body are triangles.

3. The air shaping insert of claim 1 wherein the cross sections of the insert body are rectangular.

4. The air shaping insert of claim 1 further including bendable junctions between the planar sides of the insert body to permit adjustment of the angles of the joints to adjust the cross section of the insert body.

5. The air shaping insert of claim 1 further including filler volumes attached to the planar sides of the insert body to adjust the cross section of the insert body.

6. The air shaping insert of claim 1 further including a "L" shaped bend in one side of the insert body, with the small leg of the "L" oriented approximately in the plane of the mouth of the bag, to reduce the cross section of the insert body.

* * * * *

UNITED STATES PATENT AND TRADEMARK OFFICE
CERTIFICATE OF CORRECTION

PATENT NO. : 4,632,680
DATED : December 30, 1986
INVENTOR(S) : William J. Klimczak It is certified that error appears in the above-identified patent and that said Letters Patent are hereby corrected as shown below:

Title Page, Item [73] should read as follows:
--[73] Assignee: Howden Environmental Systems, Inc., Minneapolis, Minn.

Signed and Sealed this

Thirty-first Day of May, 1988

Attest:

DONALD J. QUIGG

Attesting Officer

Commissioner of Patents and Trademarks